(12) United States Patent
Lin

(10) Patent No.: US 9,755,792 B1
(45) Date of Patent: Sep. 5, 2017

(54) GENERATING AND CHECKING A QUATERNARY PSEUDO RANDOM BINARY SEQUENCE

(71) Applicant: Xilinx, Inc., San Jose, CA (US)

(72) Inventor: Winson Lin, Daly City, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/149,937

(22) Filed: May 9, 2016

(51) Int. Cl.
*H04B 17/00* (2015.01)
*H04L 1/24* (2006.01)
*H04L 25/49* (2006.01)
*H04L 25/03* (2006.01)

(52) U.S. Cl.
CPC .......... *H04L 1/244* (2013.01); *H04L 25/4917* (2013.01); *H04L 25/03343* (2013.01)

(58) Field of Classification Search
CPC ... H04L 1/205; H04L 43/50; G01R 31/31709; G01R 29/26; G06F 11/263
USPC ........... 375/226, 146, 260; 714/807; 455/91, 455/11.1; 708/250, 252
See application file for complete search history.

(56) References Cited

U.S. PATENT DOCUMENTS

| | | | | |
|---|---|---|---|---|
| 2008/0155233 A1* | 6/2008 | Ward | ............... | G06F 9/4818 712/220 |
| 2008/0170632 A1* | 7/2008 | Sohn | ............... | H04J 13/10 375/260 |
| 2011/0200124 A1 | 8/2011 | Nara | | |
| 2012/0066572 A1* | 3/2012 | Lim | ............... | H04L 1/0072 714/807 |
| 2013/0055039 A1 | 2/2013 | Dearth | | |
| 2014/0146833 A1 | 5/2014 | Lusted et al. | | |
| 2016/0087822 A1 | 3/2016 | Kossel | | |

OTHER PUBLICATIONS

LAN/MAN Standards Committee, Physical Layer Specifications and Management Parameters for 100 Gb/s Operation Over Backplanes and Copper Cables, IEEE P802.3bj/D3.2, Apr. 11, 2014, pp. 1-359, Piscataway, USA.
Butler, J.T., et al., "Fast Hardware Computation of x mod z", Navel Postgraduate School, Department of Electrical and Computer Engineering, 2011 IEEE International Symposium on Parallel and Distributed Process workshops and Phd Forum (IPDPSW), May 16-20, 2011, pp. 294-297, Anchorage, USA.
Lyubomirsky, F. I., "PRQS Test Patterns for PAM4", IEEE 802.3bs 400GbE Task Force, Sep. 14-16, 2015, 16 pages, Coconut Point, Florida, USA.
Marlett, M. et al., "CDAUI-8 PAM4 Reference Receiver CDR", Inphi Corporation, May 11, 2015, 11 pages, Santa Clara, USA.

\* cited by examiner

*Primary Examiner* — Khai Tran
(74) *Attorney, Agent, or Firm* — W. Eric Webostad; David O'Brien

(57) ABSTRACT

An apparatus and method relate generally to generation and checking of a quaternary pseudo random binary sequence ("QPRBS"). In an apparatus, there is a pseudo random binary sequence ("PRBS") generator configured to receive a seed of a PRBS to be generated. A mask generator is configured to generate a mask output corresponding to the PRBS. The PRBS generator and the mask generator are both configured for sequential operation with respect to one another. A masking circuit is configured to receive the mask output and the PRBS to bitwise mask the PRBS with the mask output to generate the QPRBS.

20 Claims, 12 Drawing Sheets

GENERATING AND CHECKING A QUATERNARY PSEUDO RANDOM BINARY SEQUENCE

FIELD OF THE INVENTION

The following description relates to integrated circuit devices ("ICs"). More particularly, the following description relates to generating and checking a quaternary pseudo random binary sequence in an IC.

BACKGROUND

Pulse-amplitude modulation ("PAM") is a common mechanism for high-speed applications such as physical link layers, with PAM2 (also known as NRZ) being the most commonly used to support up to 28 gigabits per second (Gbps) for serial communications. More recently, PAM4, which uses four distinct amplitude levels (e.g., $-1$, $-\frac{1}{3}$, $+\frac{1}{3}$, $+1$ volts) each of which is represented by a combination of two bits (e.g., 00, 01, 10, 11) has been suggested for use in high-speed communication links beyond 28 Gbps.

To test a high-speed communication link, a test pattern may be transmitted by a transmitter over such a communication link for receiving and checking for errors by a receiver. Such test pattern may thus be used to determine impact of channel loss, intersymbol interference (e.g., crosstalk), and other factors which may have an effect on an error rate. A pseudo random binary sequence ("PRBS") is commonly used as a test pattern for PAM2/NRZ. However, PRBS patterns when mapped to PAM4 could result in poor baseline wander and clock content. Others have suggested using a quaternary pseudo random binary sequence ("QPRBS") to produce a test pattern for PAM4 to achieve similar random characteristics.

Hence, it is desirable and useful to provide an IC having a capability of generating a QPRBS and/or checking a communicated QPRBS.

SUMMARY

An apparatus relates generally to generation of a quaternary pseudo random binary sequence ("QPRBS"). In such an apparatus, there is a pseudo random binary sequence ("PRBS") generator configured to receive a seed of a PRBS to be generated. A mask generator is configured to generate a mask output corresponding to the PRBS. The PRBS generator and the mask generator are both configured for sequential operation with respect to one another. A masking circuit is configured to receive the mask output and the PRBS to bitwise mask the PRBS with the mask output to generate the QPRBS.

An apparatus relates generally to checking a QPRBS. In such an apparatus, a PRBS generator is configured to receive a seed for a PRBS to be generated. A mask generator is configured to receive a count value for the PRBS to generate a mask output. The PRBS generator and the mask generator are both configured for sequential operation with respect to one another. A first masking circuit is configured to receive the mask output and the PRBS to bitwise mask the PRBS with the mask output to generate the QPRBS. A select circuit is configured to receive data to selectively invert the data received to output as the seed. A controller is configured to control operation of the QPRBS generator responsive to an error mask and to select the seed output from the select circuit. A second masking circuit is configured to receive the data and the QPRBS to bitwise mask the received data with the QPRBS to generate the error mask.

A method relates generally to generation of a QPRBS. In such an apparatus, a PRBS generator obtains a seed of a PRBS to be generated. A count value is received by a mask generator. The PRBS is generated with the PRBS generator. A mask output for the PRBS is generated with the mask generator. The PRBS generator and the mask generator are sequentially operated together for the generating of the PRBS and the mask output. A masking circuit bitwise masks the PRBS with the mask output to generate the QPRBS.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

A quaternary pseudo random binary sequence ("QPRBS") may be used for a test pattern. Below is described a QPRBS generator and a QPRBS checker capable of being used with any polynomial and with a low gate count. Along those lines, a QPRBS generator and checker is built upon a conventional pseudo random binary sequence ("PRBS") generator. For a QPRBS generator, a mask generator and a masking circuit are used with the PRBS generator to generate a QPRBS. For a QPRBS checker, a finite state machine controller in addition to a QPRBS generator and an error masking circuit may be used. Other features and advantages are described below.

With the above general understanding borne in mind, various configurations for QPRBS generation and checking are generally described below.

Figure 1:
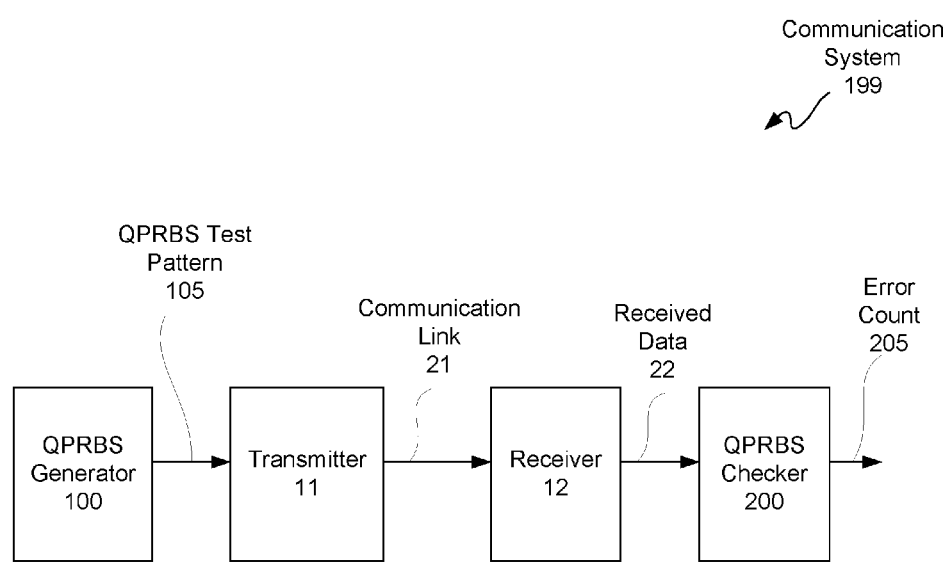
FIG. 1 is a block diagram depicting an exemplary communications system.

FIG. 1 is a block diagram depicting an exemplary communications system 199. Communications system 199 may be put in a test mode. Along those lines, communications system 199 may include a quaternary pseudo random binary sequence ("QPRBS") generator 100, a transmitter 11, a receiver 12 and a QPRBS checker 200.

For a test mode, QPRBS generator 100 may generate a QPRBS test pattern 105. A QPRBS test pattern 105 includes a conventional pseudo random binary sequence ("PRBS") that is inverted every other cycle of a complete sequence of a PRBS.

For purposes of clarity by way of example and not limitation, it shall be assumed that QPRBS test pattern 105 is for a four-level pulse amplitude modulation ("PAM4"). However, other types of modulation may be used in other examples. For example, a non-return to zero ("NRZ") or enhanced NRZ ("ENRZ") modulation or other modulation may be used.

Use of a quaternary PRBS13, namely a PRBS with an inversion in every other cycle of an underlying completed PRBS, was first proposed in IEEE P802.3bj. While the following description is in terms of PRBS7 for purposes of clarity by way of example and not limitation, it should be understood that other types of PRBS may be used, namely PRBSk for k a positive integer. For example, PRBS13 may be used, where the polynomial used for PRBS13 is $x^{13}+x^{12}+x^2+x+1$, which may be implemented in hardware with a linear feedback shift register ("LFSR") as is known. However, as PRBSk may be used, other polynomials may be implemented, such as with an LFSR or other hardware implementation.

The polynomial for PRBS7 is $x^7+x^6+1$. The maximum count or maximum length of sequence, N, for a PRBSk sequence is $2^k-1$. Thus, for PRBS7, the maximum count is $2^7-1$, or 127−1, or 126. This is because counting starts at 0. Therefore, a PRBS7 sequence of 127 elements has elements 0 through 126. For a QPRBS7, a sequence may be composed of elements . . . 0, 1, 2, . . . , 125, 126, ~0, ~1, ~2, . . . , ~125, ~126, 0, 1, 2, . . . , where "~" indicates inversion. Therefore, it is relevant to determine where in a QPRBS an inversion occurs. Because PAM4 has four logic levels, conventionally −1, −⅓, +⅓, and +1 volts, each data item or symbol has two bits, such as for example 00, 01, 10, and 11 corresponding to the four different logic levels.

A seed input, namely a starting element for a sequence, may be provided to a PRBS generator to start generation of a sequence. This seed input may be any sequence element and may be provided randomly.

A QPRBS test pattern 105 may thus be output from QPRBS generator 100 and provided as a data input to transmitter 11. Transmitter 11 may transmit such input data over a communication link 21 having one or more communication channels to a receiver 12. In this example, communication link 21 is a wired link. However, in other implementations, other than a wired communication link may be used.

Receiver 12 receives transmitted information and processes such transmitted information to obtain received data 22. This received data 22 output from receiver 12 may be input to a QPRBS checker 200. QPRBS generator 100 and QPRBS checker 200 may be set up or otherwise configured for a same PRBSk, which in this example is PRBS7. Along those lines, QPRBS checker 200 may be configured to know what data to expect ("expected data"), and compare such expected data to corresponding received data in received data 22 in order to determine whether any errors are detected.

QPRBS checker 200 may be configured to output an error count 205 in order to determine a bit error rate ("BER") for communications link 21, or more particularly to determine a BER for one or more channels of communications link 21. As a communication link 21 may be a PCB, a backplane, a connector, or other form of hardware, a communication linkage may be tested for such hardwired linkage.

Figure 2:
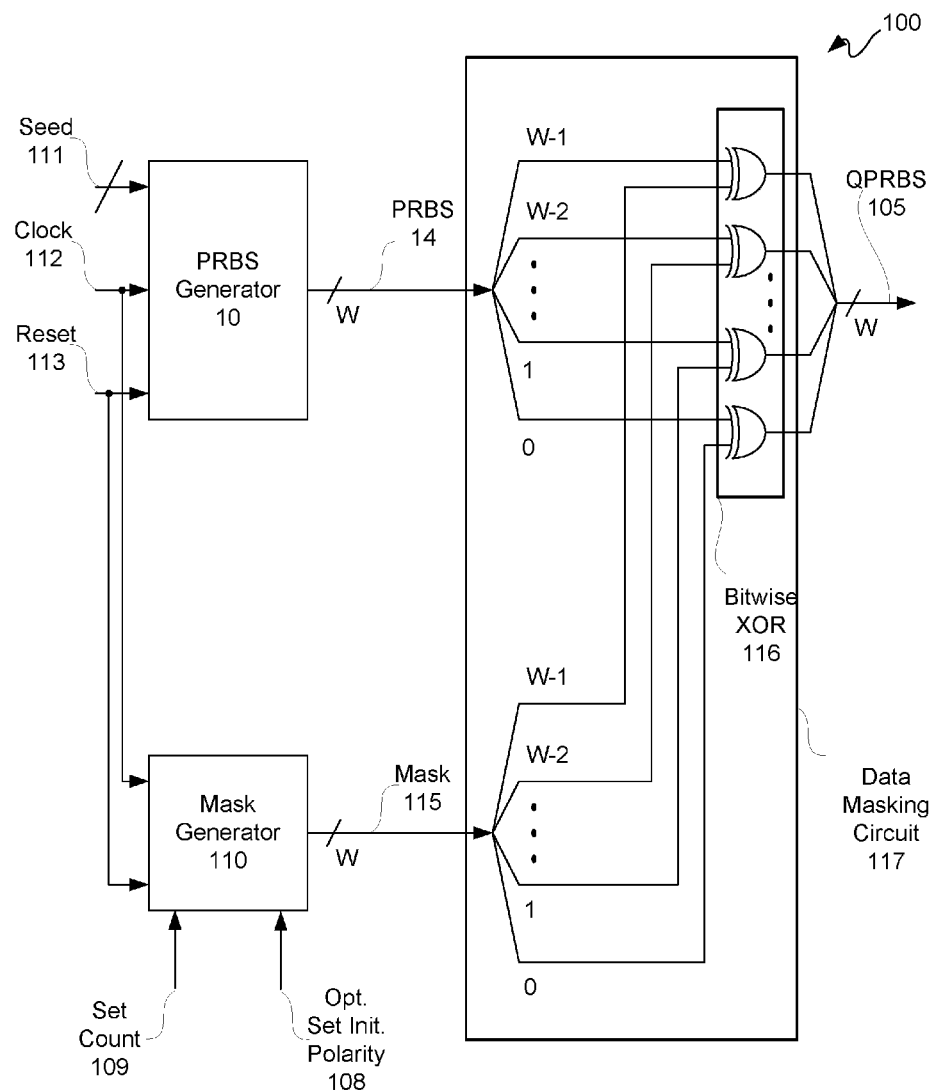
FIG. 2 is a schematic diagram depicting an exemplary quaternary pseudo random binary sequence ("QPRBS") generator.

FIG. 2 is a schematic diagram depicting an exemplary QPRBS generator 100. QPRBS generator 100 includes a PRBS generator 10, a mask generator 110, and a data masking circuit 117. PRBS generator 10 may be a conventional PRBS generator formed in hardware. PRBS generator 10 and mask generator 110 may be clocked and reset with one another for sequential operation responsive to commonly received clock signal 112 and reset signal 113, respectively.

PRBS generator 10 may be configured to receive a seed 111 of a PRBS 14 to be generated. Seed 111 need not be predetermined. Along those lines, a PRBS 14 output from PRBS generator 10 may have a bit width, W, for elements of a PRBS 14. Thus, even though this is a parallel bus of bit width W, output from PRBS generator 10 is a serial output of a sequence of elements of a PRBS 14. For purposes of clarity by way of example and not limitation, it shall be assumed that this bit or window width W is four bits wide, namely two PAM4 symbols at a time, for PRBS7. However, other bit or window widths may be used as may vary from application-to-application.

Mask generator 110 may be configured to receive a set count value 109 for such a PRBS 14 to be generated to provide a mask output 115. Again, PRBS generator 10 and mask generator 110 may both be configured for sequential operation with respect to one another. Thus, this set count value 109 may optionally be a default setting invoked at startup or responsive to assertion of reset signal 113. Likewise, optionally mask generator 110 may be coupled to set an initial polarity 108 for a corresponding PRBS 14. However, an initial polarity may be a default setting invoked at startup or responsive to assertion of reset signal 113. Setting of a count and a polarity for a PRBS 14 are described below in additional detail.

Mask generator 110 outputs a mask output 115 of bit width W corresponding to bit width W of PRBS 14 for subsequent bitwise masking by data masking circuit 117.

Mask output 115 may be generated using a counter to keep track of the number of bits of a current polarity for a PRBS 14. Along those lines, mask output 115 may be sourced from output of a polarity inverter of mask generator 110. For example, generally mask output 115 will be all logic zeros ("logic 0's") or all logic ones ("logic 1's") depending on polarity. However, there may be instances when part of mask output 115 is for a polarity of a next PRBS in a series of pseudo random binary sequences ("PRBSs") which may be used to provide a test pattern, and so mask output 115 may have one or more bits of an opposite logic state corresponding to a polarity inversion. A remainder in mask output 115, namely number of bits in a window W attributable to a next PRBS, may be used for the next sequence in a series of PRBSs.

A mask output 115, provided on a parallel signal bus of bus width W, may be thought of as window width for masking a PRBS 14. Along those lines, these parallel serial busses correspond to one another where the bus for masking output 115 is effectively a parallel bus inversion mask. During non-QPRBS generation, masking output 115 may be set to zero or otherwise disabled.

Data masking circuit ("masking circuit") 117 is configured to receive mask output 115 and PRBS 14 to bitwise mask PRBS 14 with mask output 115 to generate a QPRBS 105. Masking circuit 117 may be a combinatorial circuit in contrast to the sequential circuits of PRBS generator 10 and mask generator 110.

Masking circuit 117 includes exclusive-OR ("XOR") gates 116 configured for bitwise exclusive disjunction of each bit of at least one symbol per PRBS 14 element with a corresponding bit of mask output 115. Effectively, masking circuit 117 breaks up PRBS 14 into 0 through W−1 bitstreams for respective inputs to corresponding XOR gates 116. Likewise, masking circuit 117 breaks up mask output 115 into 0 through W−1 bitstreams for respective inputs to corresponding XOR gates 116. Thus, corresponding pairs of bitstreams 0 through W−1 of PRBS 14 and mask output 115 may be combinatorially bitwise masked by XOR gates 116, and outputs of XOR gates 116 may collectively form a QPRBS 105 of bit width W.

Mask output 115 may be maintained to track PRBS 14 to cause an inversion thereof after the end of a sequence of PRBS 14. At this juncture, it should be appreciated that with the addition of circuitry associated with mask generator 110 and masking circuit 117, a low overhead addition to a conventional PRBS generator may be used to provide a QPRBS generator for any polynomial.

By having a counter generated mask to keep track of the number of bits of a current polarity of a PRBS, a masking output 115 may be mostly either all logic 0's or all logic 1's depending on polarity. However, as a PRBS polynomial has a size of 2^k−1 for k an integer for a PRBSk-sized sequence, there are instances where part of masking output 115 is for a current PRBS and another part of masking output 115 is for an immediately next PRBS of opposite polarity of such current PRBS. The portion of a mask of mask output 115 associated with such a next PRBS of opposite polarity of a current PRBS is referred to herein as a "remainder". A remainder may be used to determine how many bits of a mask are to be part of such a next sequence in a PRBS bit stream, namely how many bits of a mask are to be of opposite polarity.

Continuing the example of a bus or window width of W, Table I below is a generalized summary of masking output 115 for polarity 0 and polarity 1.

TABLE I

| Polarity | 0 | 1 |
|---|---|---|
| Mask (non-transition state) | 000000000 . . . 0000 | 111111111 . . . 1111 |
| Mask (transition state) | 000000000 . . . 1111 | 111111111 . . . 0000 |

For a masking output 115 in a transition state for polarity 0, such masking output 115 switches from outputting all logic 0's to outputting all logic 1's. Likewise, for a masking output 115 in a transition state for polarity 1, such masking output 115 switches from outputting all logic 1's to outputting all logic 0's. Within a window width W=4 covering a last portion of a current sequence in a transition from all logic 0's to all logic 1's, there may be any of the following combinations 0000, 0001, 0011, 0111. These possible combinations may be thought of as trailing or least significant bits of a sequence of polarity 0. If a window width W=4 covering a last portion of a current sequence in a transition from all logic 0's to all logic 1's is 1111, then effectively there is no remainder as the window W is completely in the next sequence of opposite polarity with respect to the polarity of the previous sequence.

Likewise, within a window width W=4 covering a last portion of a current sequence in a transition from all logic 1's to all logic 0's, there may be any of the following combinations 1111, 1110, 1100, 1000. These possible combinations may be thought of as trailing or least significant bits of a sequence of polarity 1. If a window width W=4 covering a last portion of a current sequence in a transition from all logic 1's to all logic 0's is 0000, then effectively there is no remainder as the window W is completely in the next sequence of opposite polarity with respect to the polarity of the previous sequence.

For 0000, 0001, 0011, 0111 of a polarity of 0 and for 1111, 1110, 1100, 1000 of a polarity of 1, a remainder may correspondingly be coded as 00, 01, 10, 11. In other words, a remainder may be an actual count of logic 1's or logic 0's in a final sample window of a sequence, namely a PRBS of a QPRBS, which is not subject to polarity inversion. Along those lines, for a mask output for a transition state from a polarity 0 sequence to a polarity 1 sequence, a remainder may be: 00 indicating that no logic 1's are to be shifted in for the beginning of a polarity 1 PRBS of a QPRBS; 01 indicating that one logic 1 is to be shifted in for the beginning of a polarity 1 PRBS of a QPRBS; 10 indicating that two logic 1's are to be shifted in for the beginning of a polarity 1 PRBS of a QPRBS; and 11 indicating that three logic 1's are to be shifted in for the beginning of a polarity 1 PRBS of a QPRBS. Likewise, for a mask output for a transition state from a polarity 1 sequence to a polarity 0 sequence, a remainder may be: 00 indicating that no logic 0's are to be shifted in for the beginning of a polarity 0 PRBS of a QPRBS; 01 indicating that one logic 0 is to be shifted in for the beginning of a polarity 0 PRBS of a QPRBS; 10 indicating that two logic 0's are to be shifted in for the beginning of a polarity 0 PRBS of a QPRBS; and 11 indicating that three logic 0's are to be shifted in for the beginning of a polarity 0 PRBS of a QPRBS. Even though this is an example of a two bit remainder value for supporting a window width of W=4, it should be understood that other bit widths for a remainder value may be used responsive to window width.

Figure 3:
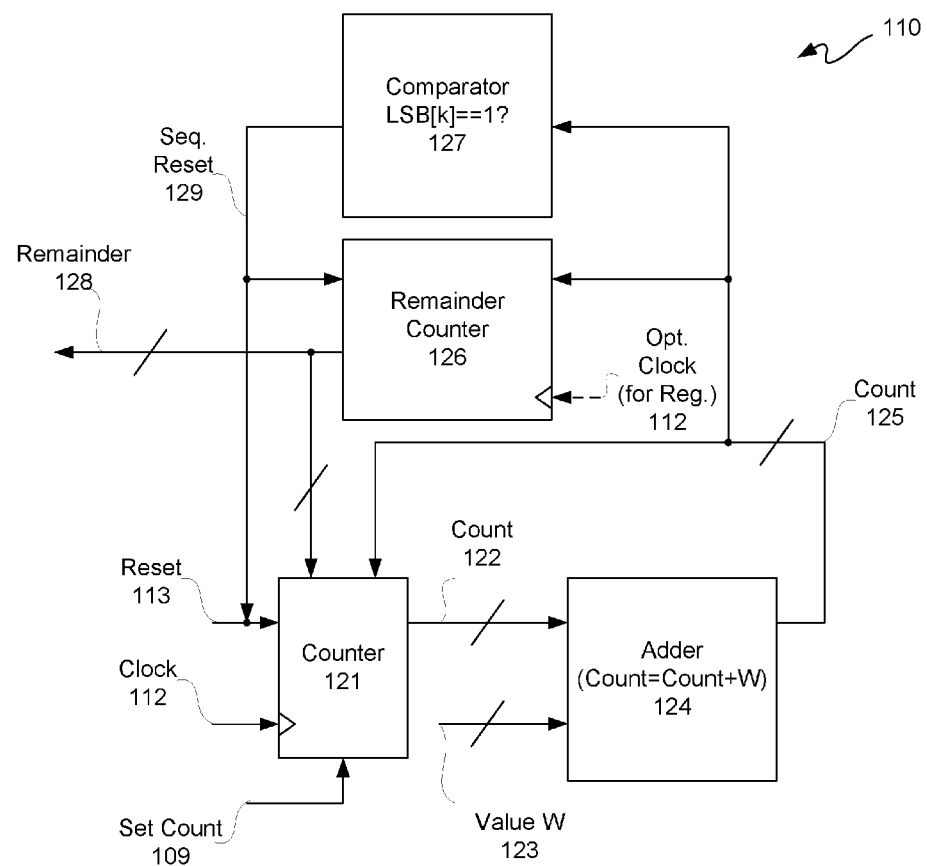
FIGS. 3 and 4 in combination is a schematic diagram depicting an exemplary mask generator.
Figure 4:
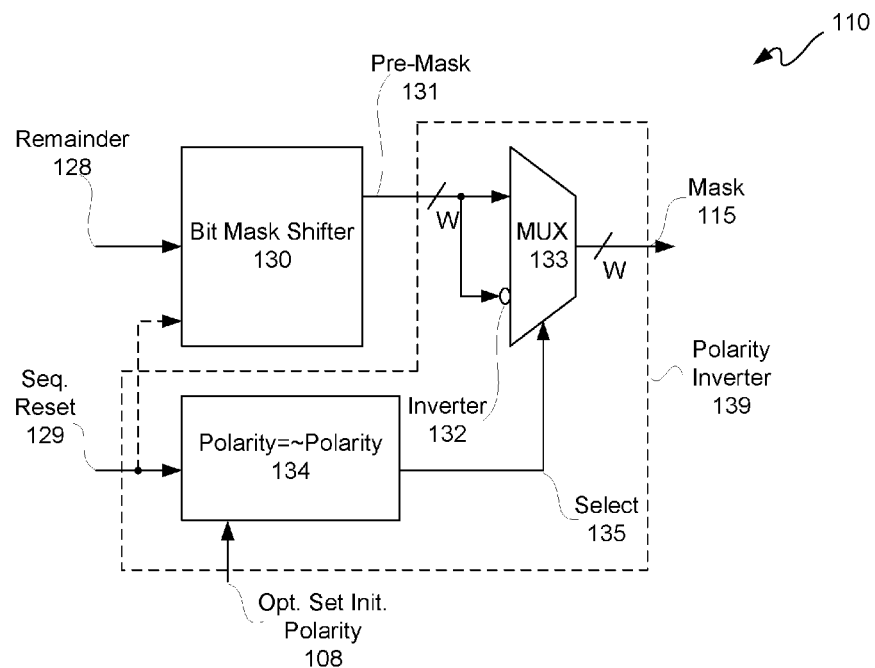

FIGS. 3 and 4 in combination is a schematic diagram depicting an exemplary mask generator 110. FIGS. 3 and 4 are described below in additional detail.

A sequence position counter 121 of mask generator 110 may be configured to receive a set count value 109 and to provide a feedforward count 122. Set count value 109 may be an initial starting point for an initial sequence, and thereafter an initial starting point may be automatically incremented for subsequent sequences. Optionally, set count value 109 may be a default value. Sequence position counter 121 may be coupled to receive reset signal 113 and clock signal 112 for sequential operation with PRBS generator 10.

An adder 124 of mask generator 110 may be configured to receive a current count value of feedforward count 122 and to add such a current count value to an integer width value W 123 of mask output 115 to increment such current count value to provide a feedback count 125. Sequence position counter 121 may be configured to receive feedback count 125 to increment a feedforward count 122, such as on a next clock cycle of clock signal 112. For purposes of clarity by way of example and not limitation, continuing the above example of a 0 to 126 bit sequence with a 4-bit wide window (i.e., W=4), then assuming a set count value 109 is equal to 1 for an initial sequence, such initial sequence of a PRBS of a QPRBS would count 1, 5, 9, . . . , 125, 129 with a transition mask of 0000. However, bit 128 would be a first bit position of a next sequence of a PRBS of a QPRBS, and thus bit 129 represents an overshoot by two bit positions. Because of this overshoot of two bit positions, this next sequence has an initial count value for starting at bit position 2. This means that a count for such sequence would be 2, 6, 10, . . . , 126, 130 with a transition mask of 0001. As bit 130 represents an overshoot by three bit positions, this next sequence has an initial count value for starting at bit position 3, namely a count sequence of 3, 7, 11, . . . , 127, 131 with a transition mask of 0011). This progression may continue until the overshoot is the same value as W+1. In this example, such sequence would be 4, 8, 12, . . . , 129, 132 with a transition mask of 0111. As bit 132 represents an overshoot by five bit positions, this next sequence has an initial count value for starting at bit position 1. This is because the transition mask is going to start repeating. For this example implementation, a next sequence 5, 9, 13, . . . , 130, 133 (transition mask=0000) is no different than the first sequence 1, 5, 9, . . . , 125, 129 (transition mask=0000).

A remainder counter 126 of mask generator 110 may be configured to receive feedback count 125 and to count modulus W to provide a remainder value 128. In this example implementation, remainder counter 126 is a combinatorial circuit; however, in another implementation, remainder counter 126 may include a register and thus optionally clock signal 112 may be provided to remainder counter 126 for clocked operation of such register. A combinatorial circuit for modulus W may simply be a concatenation from bit W−1 to bit 0.

A remainder value 128 output from remainder counter 126 may be provided to sequence position counter 121. However, such remainder value 128 may only be loaded into sequence position counter 121 responsive to assertion of sequence reset signal 129. Assuming sequence reset signal 129 is asserted, then sequence position counter 121 is reset to start counting anew for a starting bit position of a next sequence, namely for a transition from a current polarity of a current sequence to an inversion of such current polarity for a next sequence. A remainder value 128 obtained from remainder counter 126 may be used to reset an initial starting position, as previously described, of such counter, as such adding one to remainder value 128 indicates the amount of overshoot.

A combinatorial circuit 127 of mask generator 110 may be configured to receive feedback count 125 to determine whether the end of a current PRBS is reached in order to assert sequence reset signal 129. In this implementation, combinatorial circuit 127 is a comparator 127. It should be understood that comparator 127, remainder counter 126 and adder 124 may all be non-sequential circuits, and so only sequence position counter 121 may be a sequential circuit.

Comparator 127 may be configured to receive feedback count 125 for comparison of a k-th bit position value in feedback count 125 with a logic value indicative of a feedback count being greater than $2^k-1$ for k an integer for a PRBSk-sized sequence. Comparator 127 may be configured to assert sequence reset 129 responsive to such k-th bit position in feedback count 125 being equal to such logic value.

Continuing the above example for k=7, the k-th bit position would be the 7th LSB position or LSB[k]. Assuming for purposes of clarity by way of example and not limitation that counter 121 is a 16-bit counter, then in such an implementation when a 7th LSB position of feedback count 125 is a logic 1, the value of such feedback count 125 would be equal to or greater than $2^k$. Comparator 127 may thus be configured to compare an LSB[k] value for equality with a logic 1, and if such equality is found, then sequence reset 129 may be asserted responsive to feedback count 125 being greater than $2^k-1$.

Sequence position counter 121 and remainder counter 126 may both be configured to receive sequence reset 129 to reset sequence position counter 121 and remainder counter 126 generally at the same time, though a current remainder value of remainder value 128 plus one is loaded into counter 121 prior to resetting such remainder value such as to zero in remainder counter 126. Again, sequence position counter 121 may be configured to receive a remainder value from remainder value 128 to increment a starting bit position or starting count value to provide feedforward count 122 anew after reset responsive to assertion of sequence reset 129.

A bit mask shifter 130 of mask generator 110 may be configured to receive a remainder value of remainder value 128 to shift in a number of either logic 0's or logic 1's responsive to such remainder value indicating an overlap between adjacent PRBSs output from PRBS generator 10 within an integer width value W 123 to provide a pre-mask output 131. Bit mask shifter 130 may be a combinatorial circuit.

Bit mask shifter 130 may be configured with a bit mask and be configured to shift none, some, or all of the bits of such bit mask responsive to remainder 128. Remainder 128 may indicate some or no logic 0's or 1's, depending on polarity, to shift into a bit mask as previously described responsive to a mask output 115 in a transition state. However, during a non-transition state, such mask output 115 is either all logic 0's or 1's, so no bit shifting is performed by bit mask shifter 130 during such a non-transition state. Thus, bit mask shifter 130 is configured to output a number W of either all logic 0's or all logic 1's during a non-transition state, which may be indicated by remainder 128. Bit mask shifter 130 may further be configured to shift in a number of either logic 0's or logic 1's, as previously described, responsive to a remainder value and a current polarity, where a current polarity may be determined from remainder 128.

A polarity inverter 139 of mask generator 110 may be configured to receive sequence reset 129 and to invert a current polarity of pre-mask output 131 responsive to assertion of sequence reset 129 to provide mask output 115.

Polarity inverter 139 may be a combinatorial circuit. Thus, in an implementation of mask generator 110, all circuitry other than sequence position counter 121 may be non-sequential, where sequence position counter 121 effectively controls sequential operation of mask generator 110.

In this implementation, polarity inverter 139 includes a controllable inverter 134, an inverter 132 and a multiplexer 133. Controllable inverter 134 may be configured to receive sequence reset 129, and responsive to assertion of sequence reset signal 129, controllable inverter 134 may invert a current polarity to output such polarity after inversion as a control select signal 135. Optionally, an initial polarity for controllable inverter 134 may be set responsive to optional set initial polarity signal 108; however, a default value, such as either polarity 0 or 1, may be used corresponding to a default value for an initial polarity used by PRBS generator 10.

Pre-mask output 131 output from bit mask shifter 130 may be either all logic 0's or all logic 1's during a non-transition state of a PRBS 14. During a transition state of adjacent PRBSs 14, bit mask shifter 130 may shift in a number of either logic 0's or logic 1's responsive to a remainder indicating an overlap between adjacent PRBSs output from PRBS generator 10 within the integer width value W 123 to provide pre-mask output 131. Pre-mask output 131 may be provided as a data input to multiplexer 133 and as a data input to inverter 132. Output from inverter 132 may be provided as another data input to multiplexer 133. While determining a transition or non-transition state may be entirely done by bit mask shifter 130 using remainder 128, optionally bit mask shifter 130 may be configured to receive sequential reset 129 and to delineate between transitional and non-transitional states responsive to state of sequential reset signal 129.

Responsive to control select signal 135, multiplexer 133 may output as mask output 115 either a non-inverted or inverted version of pre-mask output 131. Masking circuit 117, which is a combinatorial circuit, may thus be configured to receive mask output 115 from polarity inverter 139 and to receive PRBS 14 from PRBS generator 10 to bitwise mask at least one symbol at a time of PRBS 14 to generate QPRBS 105.

Figure 5:
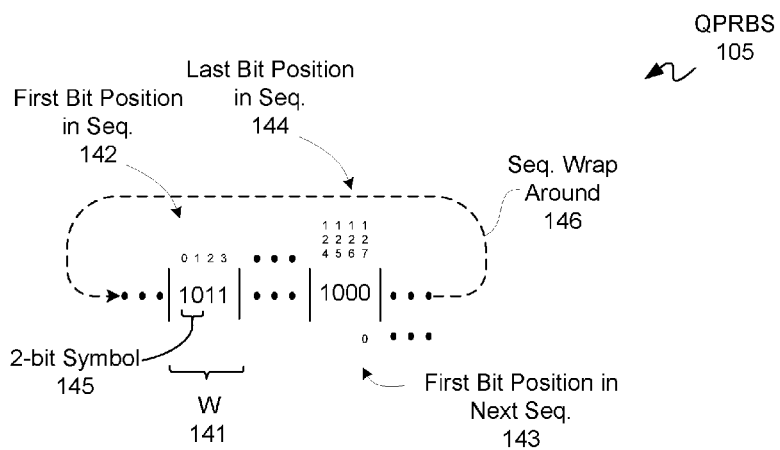
FIG. 5 is a bit sequence diagram depicting an exemplary QPRBS.

FIG. 5 is a bit sequence diagram depicting an exemplary QPRBS 105. For purposes of clarity by way of example and not limitation, the above-example of k=7 and W=4 is continued for the example of FIG. 5. A window W 141 of four bits is used for PAM4, where each symbol is a 2-bit symbol 145. A first bit position 142 in a PRBS 14 may be bit position 0, and a last bit position 144 in such a PRBS 14 may be bit position 126. In this example, there is an overlap of bit position 127 within a last window W 141 of a PRBS 14, as bit position 127 is bit position 0, namely a first bit position 143, in the next though inverted PRBS 14. After completion of an inverted PRBS 14, another non-inverted PRBS 14 may be initiated, as generally indicated with sequence wrap around 146. However, a pattern in a QPRBS may not simply loop around naturally as is known for a conventional PRBS pattern, where the start bit and the end bit of a conventional PRBS is inconsequential. The presence of a transition from a non-inverted to an inverted PRBS 14 results in specific bits in such sequence that determine the last bit position in a current sequence 144 and the first bit position in a next sequence 143 following immediately thereafter.

Figure 6:
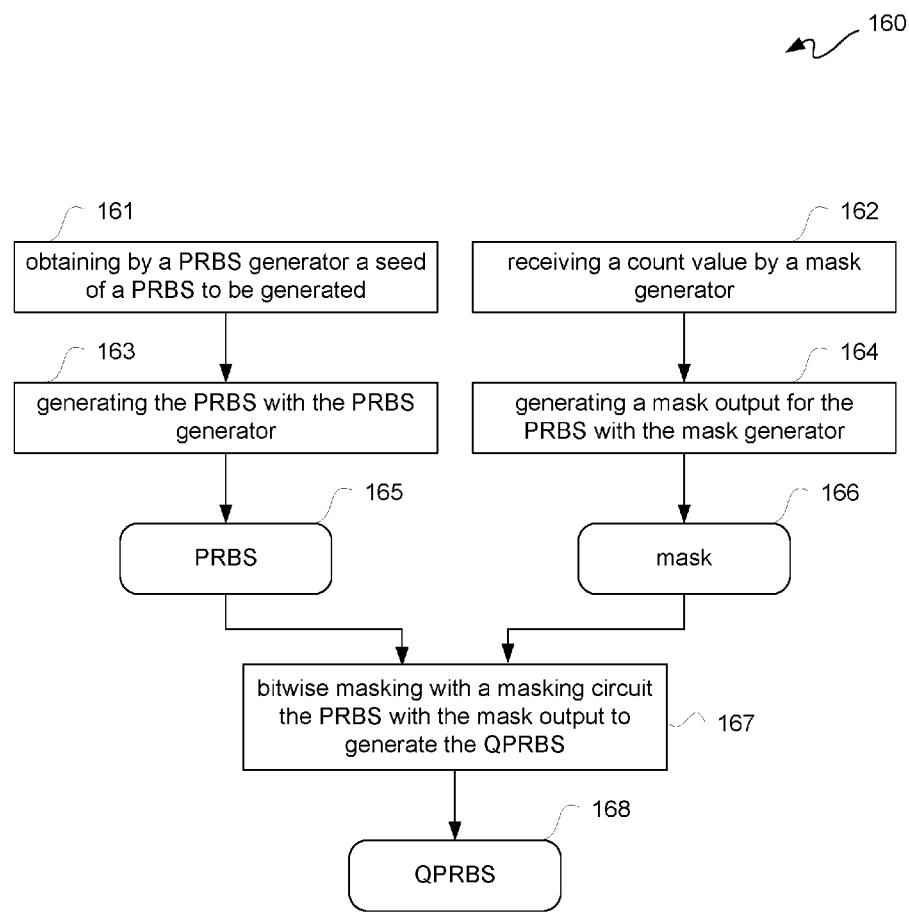
FIG. 6 is a flow diagram depicting an exemplary QPRBS generation flow.

FIG. 6 is a flow diagram depicting an exemplary QPRBS generation flow 160. QPRBS generation flow 160 follows from previously described operations of QPRBS generator 100, which description is generally not repeated below for purposes of clarity and not limitation.

At 161, a PRBS generator obtains a seed of a PRBS to be generated, and at 162, an initial count value is received by a mask generator. At 163, such a PRBS generator generates such a PRBS 165, and at 164 such a mask generator generates a mask 166 output for such a PRBS 165. For operations at 163 and 164, such PRBS generator and mask generator are sequentially operated together, such as responsive to commonly received clock and reset signals.

At 167, a masking circuit bitwise masks PRBS 165 with mask 166 to generate a QPRBS 168. As previously described, a combinatorial masking circuit may receive a mask output 115 from a polarity inverter and receive a PRBS from a PRBS generator to bitwise mask at least one symbol at a time of such PRBS to generate a QPRBS 168.

Figure 7:
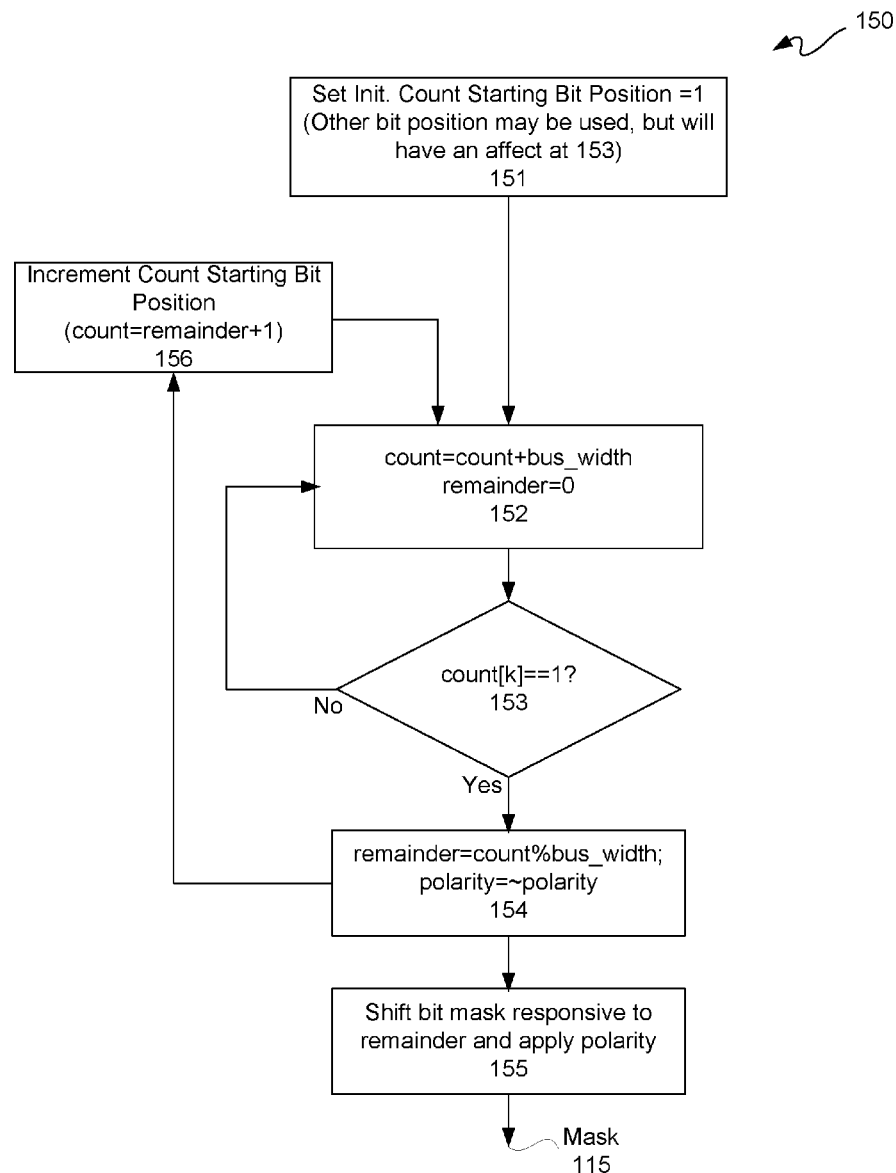
FIG. 7 is a flow diagram depicting an exemplary mask generation flow.

FIG. 7 is a flow diagram depicting an exemplary mask generation flow 150. Mask generation flow 150 corresponds to operations of mask generator 110 of FIG. 2 for generating a mask at 164 of FIG. 6. At 151, an initial count starting bit position is set. In this implementation, such an initial count starting bit position is set equal to 1 by set count signal 109. An initial count starting bit position other than 1 may be used, but such other positions may have an effect on operation at 153. For purposes of clarity by way of example and not limitation, it shall be assumed that an initial count starting bit position is set to 1 and the above-example of k=7 is continued. Thus, a bit count from 1 to 127 is a complete PRBS.

At 152, a new count is set equal to a current count added or incremented by a bus width W. At 152, a remainder is initialized to zero. A remainder may be initialized to zero at 151; however, to clearly indicate that a remainder is loaded prior to resetting to zero after a sequence reset, setting/resetting of a remainder to zero is performed at 152.

Along those lines, at 152 a first count value set at 151 may be obtained by a sequence position counter 121. A feedforward count 122 may be generated by such sequence position counter 121 to provide an initial count at 152. At 152, such feedforward count 122 may be added, such as with adder 124, with a bus integer width value W 123, namely a bus width of a mask, to increment such feedforward count 122 to provide a count anew, namely a feedback count 125.

At 153, a k-th bit position value in a feedback count 125 is compared with a logic value indicative of a feedback count being greater than $2^k-1$ for k an integer for a PRBSk-sized sequence. In this implementation, this logic value is a logic 1 for purposes of comparison. If this comparison fails at 153, then a current count is incremented for another iteration or clock cycle of clock signal 112 at 152 by bus width W to provide a current count anew, as previously described, and remainder is maintained at zero. If, however, this comparison does not fail at 153, then at 154 a remainder is increased by the then current count modulus W, and at 154 a then current polarity is inverted.

As previously described, a combinatorial circuit may be used to determine whether a feedback count indicates an end of a then current PRBS for this comparison at 153, and such combinatorial circuit may assert a sequence reset (i.e., "Yes") responsive to such feedback count indicating such end of such a then current PRBS. If the conditions at 153 are true, a sequence reset is asserted responsive to a k-th bit position in a feedback count being equal to a logic value of 1. Moreover, as previously described, for the condition at 153 being false, a feedback count loops back through a sequence position counter 121 for subsequent incrementing at 152. Increasing a remainder at 154 may be implemented with a counter, such as remainder counter 126, or other circuitry configured to set a then current count of a feedback count modulus of a bus width value W to provide such an increased remainder.

From 154, at 156 a count starting bit position may be incremented as a then current remainder obtained from 154 plus one, and this count starting bit position may be used for starting counting anew for a next PRBS inverted in polarity responsive to inversion at 154. In other words, a sequence position counter 121 may be reset at 156 and a remainder counter may be reset at 152 responsive to assertion of a sequence reset 129. Such reset sequence position counter 121 may be incremented at 152 by such count starting bit position obtained at 156 to start counting anew starting at such count starting bit position to provide a feedforward count 122 anew after such resetting.

Also from 154, at 155 a bit mask may be shifted responsive to a remainder obtained from 154 and an inversion of the previous polarity may be applied. Again, at 155, a number of either logic zeros or logic ones may be shifted in by a bit mask shifter responsive to a remainder obtained at 154 indicating an overlap between adjacent PRBSs output from a PRBS generator within a sampling window of an integer bus width value W to provide a pre-mask output. At 155, this pre-mask output may be inverted with a polarity inverter to output a mask output 115.

Figure 8:
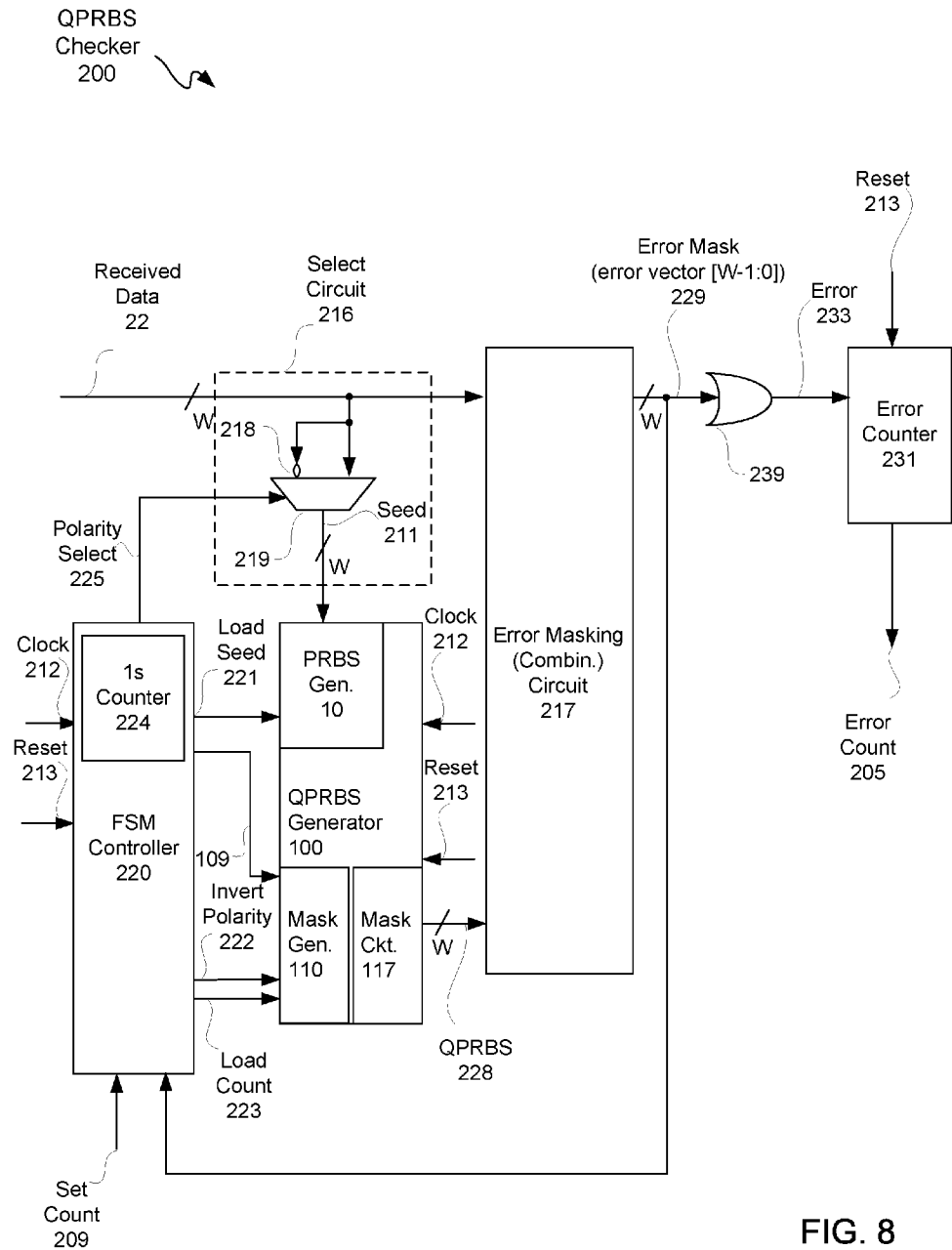
FIG. 8 is a schematic diagram depicting an exemplary QPRBS checker.

FIG. 8 is a schematic diagram depicting an exemplary QPRBS checker 200. QPRBS checker 200 includes a QPRBS generator 100, as previously described with reference to FIGS. 2-7. Accordingly, some of the description of QPRBS generator 100 is not repeated for purposes of clarity and not limitation.

QPRBS generator includes a PRBS generator 10 configured to receive a seed 211 for a PRBS to be generated. Seed 211 has an integer bit width W, where bit width W is the same as previously described.

Received data 22 is input to QPRBS checker 200 with a bit width W, and such received data 22 is provided as data inputs to error masking circuit 217, inverter 218, and a data input port of a select circuit 216. Select circuit 216 in this example implementation includes a multiplexer 219 and an inverter 218.

Output of inverter 218 is provided as another data input to multiplexer 219. A polarity select signal 225 from finite state machine ("FSM") controller 220 of QPRBS checker 200 is provided as a control select signal to multiplexer 219. Multiplexer 219 provides received data 22 as seed 211, at least one symbol at a time, in either a non-inverted or inverted state for input to PRBS generator 10. In this example, seed 211 is of a bus width W. By being able to test for both inverted and non-inverted data as a seed 211, QPRBS checker 200 may lock more quickly, namely regardless of polarity of received data 22, and may be used without a predetermined seed 211.

Again, received data 22 may have some portion of a test pattern as previously described with reference to FIG. 1 herein. Along those lines, a test pattern may include one or more test pattern sequences, which may be transmitted over some duration of time and processed in real time. Thus, a test pattern may include a single QPRBS but is not limited to including only a single QPRBS. Moreover, a test pattern may include a QPRBS, and a QPRBS may be made up of multiple PRBSs. Additionally, FSM controller 220 provides a load seed control signal 221 to PRBS generator 10 to cause seed 211 to be loaded therein. Thus, multiplexer 219 may be configured to receive data to selectively invert, or not, a portion of such data received to output as a seed.

Clock signal 212 and reset signal 213 on a receiver-side may be provided to both FSM controller 220 and QPRBS generator 100 for sequentially operating and resetting both. A mask generator 110 of QPRBS 100 may be configured to receive a load count signal 223 and an invert polarity signal 222 from FSM controller 220 such as to generate a mask output 115.

Again, PRBS generator 10 and mask generator 110 are both configured for sequential operation. A masking circuit 117 of QPRBS 100 may be configured to receive a mask output 115 and a PRBS 14 to bitwise mask such PRBS with such mask output to generate a QPRBS 228, such as to provide a test pattern for PAM4 for example, as previously described.

QPRBS 228 may be provided along with received data 22 as respective parallel W-bit wide data inputs to error masking circuit 217. In this example, error masking circuit 217 is a combinatorial circuit; however, in another implementation data inputs to error masking circuit 217 may be pipelined for input to combinatorial circuitry. Error masking circuit 217 may be configured to receive received data 22 and QPRBS 228 as respective sets of W bits each to bitwise mask them one to another to output an error mask 229. This bitwise masking may be at least one symbol at a time of QPRBS bits of QPRBS 228 with corresponding data bits of received data 22.

Error mask 229 may be a W-bit wide signal or bus. Error mask 229 is an error vector [W−1:0], as described below in additional detail. Error mask 229 may be provided as a feedback signal to FSM controller 220. FSM controller 220 may further receive a receiver-side set count signal 209.

Error mask 229 may be provided as an input to an OR gate 239 to produce an error signal 233. Error signal 233, as well as reset signal 213, may be provided to error counter 231. Error counter 231 may count errors over time detected as indicated in error signal 233 to provide an error count 205 indicative of a bit error rate ("BER") of one or more channels of a wired communication link.

FSM controller 220 may be configured to control operation of QPRBS generator 100 responsive to an error mask 229 and to select a seed 211 output from select circuit 216, as described below in additional detail. Along those lines, FSM controller 220 may be configured to check for an inversion in QPRBS 228 responsive to one or more states of bits in error mask 229. A bitwise error pattern in error mask 229 may be used to determine position of a data pattern in an underlying QPRBS, as described below in additional detail. A lock may be guaranteed quickly, namely within one full sequence cycle (e.g., a completed PRBS of polarity 0 followed by a completed PRBS of polarity 1) of an underlying QPRBS, provided, however, that no bit error occurs exactly within a parallel data bus having an inversion. In such an instance of at least one bit error within a parallel data bus having an inversion, a lock occurs within two full sequence cycles of an underlying QPRBS.

FSM controller 220 may be configured to determine a number of logic ones in a remainder to provide a ones count. Such ones count may be counted by 1s counter 224 of FSM 220. This count may be loaded into mask generator 110 on a receiver side as a set count signal 109 input responsive to assertion of load count signal 223. Along those lines, a ones count may be loaded into a sequence position counter 121 of mask generator 110 as a set count input. Moreover, FSM controller 220 may invert polarity of mask generator 110 by assertion of invert polarity signal 222, which invert polarity signal 222 may be provided as a set initial polarity signal 108 to a controllable inverter 134 of mask generator 110 on a receiver side.

Figure 9:
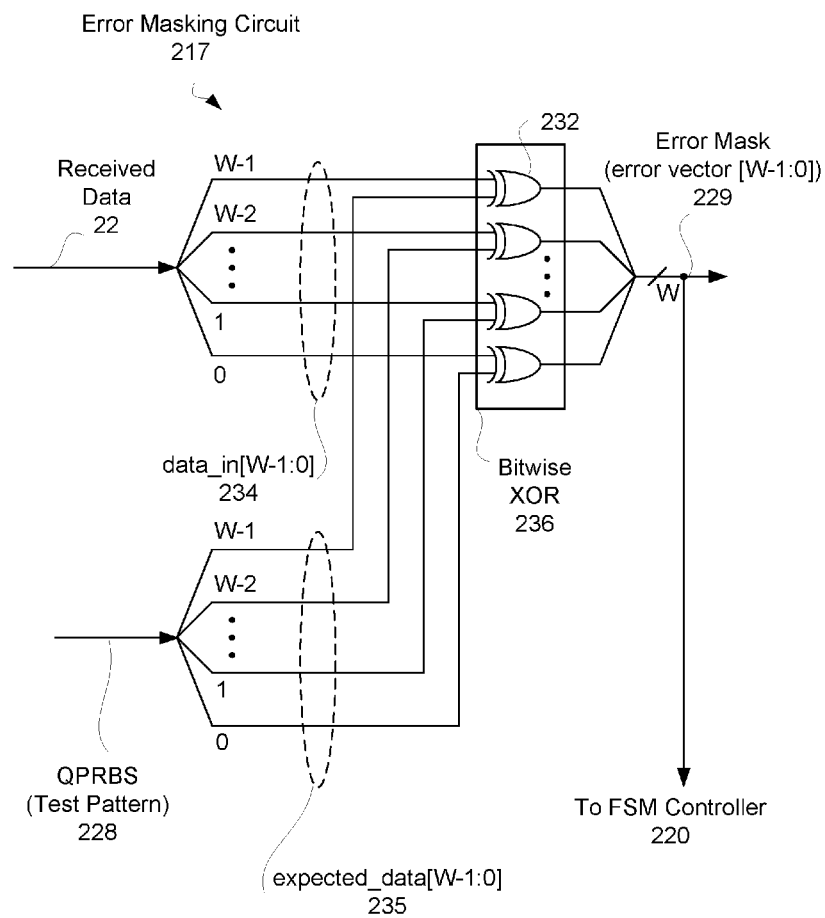
FIG. 9 is a circuit diagram depicting an exemplary error masking circuit.

FIG. 9 is a circuit diagram depicting an exemplary error masking circuit 217. In error masking circuit 217, bits [W−1:0] of received data 22 are respectively input into two-input XOR gates 232 of bitwise XOR circuit 236. This received data 22 input may be generally considered a data_in[W−1:0] signal 234. Correspondingly, in error masking circuit 217, bits [W−1:0] of QPRBS 228 are respectively input into two-input XOR gates 232 of bitwise XOR circuit 236. This QPRBS 228 input may be generally considered an expected_data[W−1:0] signal 235, as QPRBS 228 input may be include a test pattern sequence. Therefore, as a transmitter transmits a QPRBS to a receiver, and such receiver resolves such transmitted data as received data, a comparison with a same QPRBS generated at a receiver should inform whether any errors are generated. Detection of any error may be indicated by output of bitwise XORing corresponding sets of W-bits each of generated and received QPRBSs. Thus, error mask 229, which is a W-bit wide output from bitwise XOR circuit 236 is an error_vector[W−1:0] signal.

Figure 10:
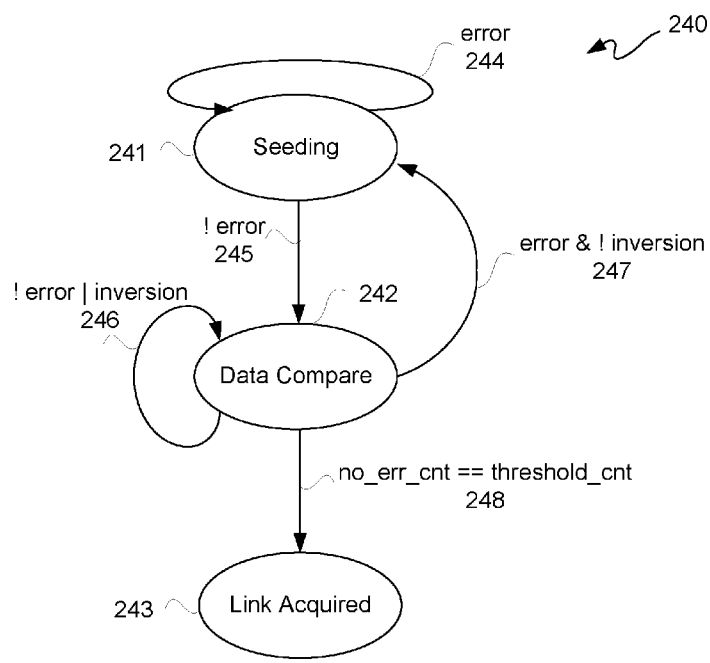
FIG. 10 is a state diagram depicting an exemplary state machine of a finite state machine ("FSM") controller.

FIG. 10 is a state diagram depicting an exemplary state machine 240 of FSM controller 220. At state 241, seeding of a PRBS generator 10 occurs. If an error 244 occurs, such as a mismatch in symbols as indicated in an error mask, state machine 240 stays in state 241. However, if there is no error 245 (i.e., not error or "! error") in seeding as indicated by an error mask, state machine 240 transitions to data compare state 242. At data compare state 242 comparison of data_in [W−1:0] signal 234 and expected_data[W−1:0] signal 235 is used to provide error masks 229 and to provide a number of no error count ("no_err_cnt"). If a number of no error count is equal to a threshold count at 248, then state machine 240 transitions to a link acquired state 243. A number of no error count is incremented at state 242 for each error mask 229 by iteratively checking and determining at 246 that no error has occurred or that an inversion 251 has occurred. If, however, at state 242 an error of some number of bits is detected and there is no inversion 251, then a transition at 247 from state 242 to state 241 occurs for re-seeding. In FIG. 10, C++ bitwise logic operators of & and I for bitwise AND and bitwise inclusive OR, respectively, are illustratively depicted.

Figure 11:
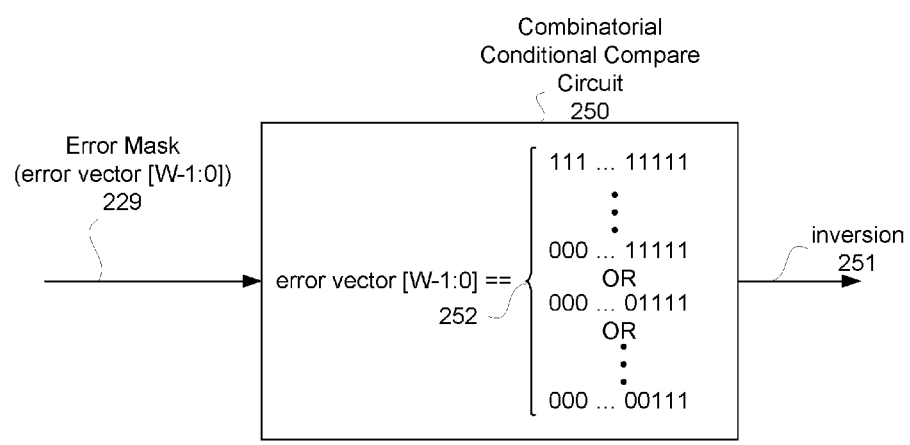
FIG. 11 is a block diagram depicting an exemplary combinatorial conditional compare circuit of the FSM controller.

FIG. 11 is a block diagram depicting an exemplary combinatorial conditional compare circuit 250 for detecting an inverted or non-inverted state for state machine 240 of FIG. 10. Along those lines, FSM controller 220 may include combinatorial conditional compare circuit 250. Combinatorial conditional compare circuit 250 may be configured to compare an error mask 229 with any of a variety of sequence bit patterns, namely inversion patterns 252. If a match is found between an error mask 229 and one of inversion patterns 252, then an inversion is detected and inversion signal 251 is asserted, such as a change in state from logic 0 to logic 1 for example. An inversion pattern is one that has some number of consecutive logic 1s starting from LSB bit 0. The number can range from 1 to W logic 1s, where one logic 1 in the LSB bit 0 position means one bit of the next sequence is in this parallel signal bus, and W logic 1s means W bits of the next sequence is in this parallel signal bus. Even though the minimum number of logic 1s of an inversion pattern can be one in this example implementation, in another implementation the minimum number of logic 1s in an inversion pattern could be set to be more than 1. Along those lines, in an implementation, the minimum number of logic 1s in an inversion pattern may be programmable in accordance with the description herein. Having more logic 1s may be used to avoid, or at least reduce the likelihood, of having a false inversion detection due to one or more random errors resulting in some perceived inverted bits even though such inverted bits in actuality are random errors. The minimum number to set depends on a level of channel loss, namely the higher the expected bit error rate, the bigger the minimum number of logic 1s.

Figure 12:
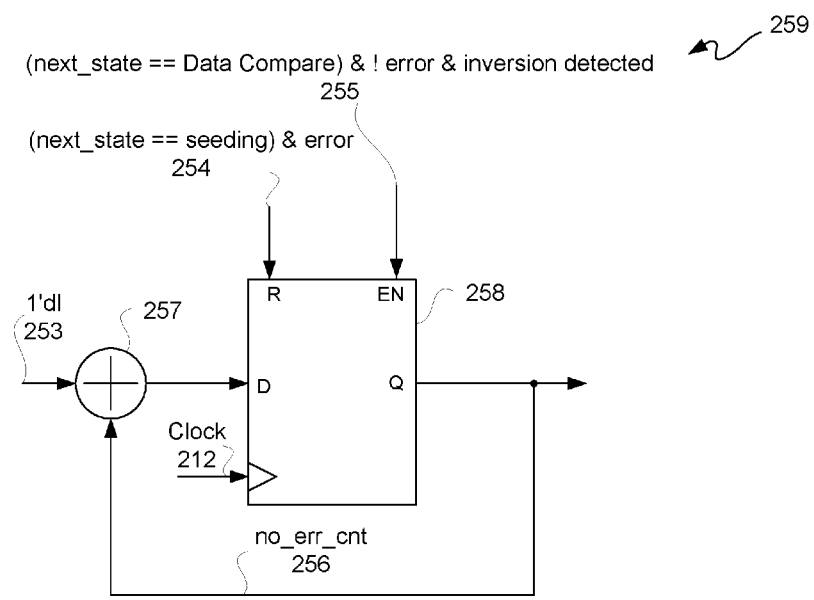
FIG. 12 is a circuit diagram depicting an exemplary counter for the state machine of FIG. 10.

FIG. 12 is a circuit diagram depicting an exemplary counter 259 of FSM controller 220. Counter 259 includes an adder 257 and a register 258 such as a DQ flip-flop for example. Register 258 may be clocked responsive to clock signal 212. A condition 255 is asserted responsive to next state going into data compare state 242, no error and an inversion detected 263 all being true, namely a bitwise AND of these three outcomes. As long as condition 255 is true, register 258 is active for counting. This refers to inversion detected which is a "sticky bit" of inversion. Along those lines, a counter only counts after the first inversion has been detected. Before that, such a counter just stays in a data compare state. So a data compare state may effectively serve two purposes: wait for the first inversion without going back to a state seeding; and count the number of no errors after the first inversion has been detected.

A data logic 1 253 ("1'd1" means a parallel data bus of W bits has been counted as no error) is loaded into adder 257 for addition with a then current no error count 256 output from register 258. Accordingly, a no error count may be accumulated at state 242 with incrementing via transitioning at 246 of FIG. 10. If condition 254 is asserted responsive to next_state going into seeding state 241 AND error detected 254 are both true, then at state 241 seeding is performed again and register 258 is reset.

Figure 13:
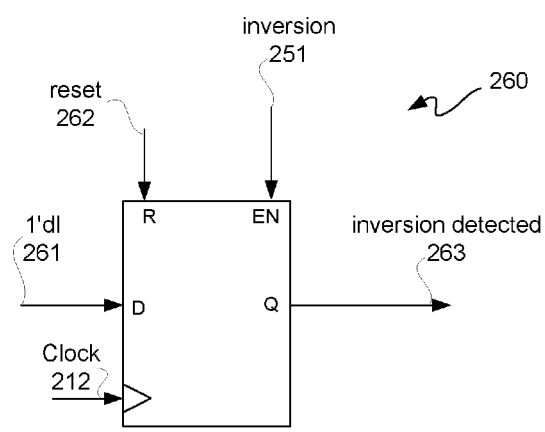
FIG. 13 is a circuit diagram depicting an exemplary inversion detection register of the FSM controller.

FIG. 13 is a circuit diagram depicting an exemplary inversion detection register 260 of FSM controller 220. Register 260 may be clocked responsive to clock signal 212. A data logic 1 261 is loaded into register 260 when inversion 251 is asserted. Reset 262, which may be reset 213 or sequence reset 129, may be asserted responsive to a reset 213 corresponding to QPRBS checker 200. If an inversion 251 is detected, such as by combinatorial conditional compare circuit 250, register 260 is activated for asserting inversion detected 263 Basically, assertion of inversion detected 263 may be for a "sticky bit" for inversion 251 as an indicator of the detection of the first inversion.

Figure 14:
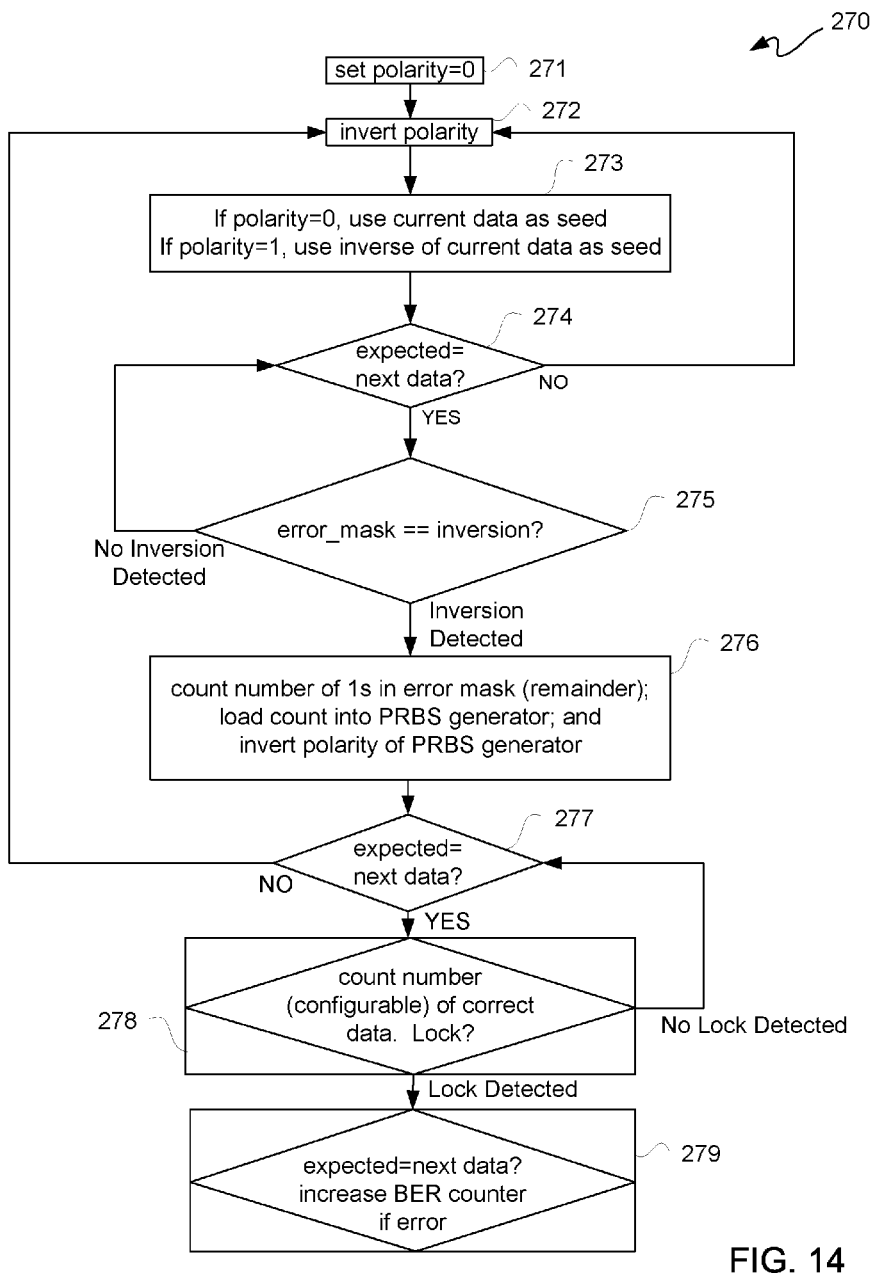
FIG. 14 is a flow diagram depicting an exemplary QPRBS checker flow.

FIG. 14 is a flow diagram depicting an exemplary QPRBS checker flow 270. QPRBS checker flow 270 corresponds to operations of QPRBS checker 200 of FIG. 8 for checking a QPRBS in received data 22 against a receiver-generated QPRBS by QPRBS checker 200.

At 271, an initial polarity is set. Polarity of a received pattern may be unknown when initially received. In this implementation, such an initial polarity is set equal to 0 as a default setting. However, in another implementation an initial polarity equal to 1 may be used. At 272, initial polarity is inverted to equal 1, thereafter for each cycle back to inversion at 272, polarity is inverted from a current state, namely polarity is toggled responsive to toggling of polarity of QPRBSs. For purposes of clarity, an initial polarity for a first QPRBS in received data 22 may be generally thought of as a 1 in 2 probability of being correct or incorrect (i.e., a "coin flip"). Setting at 271 and inverting at 272 may be by FSM controller 220, where inverting at 272 may correspond to assertion of invert polarity signal 222.

From 272, at 273 current data is used as a seed for polarity equal to 0, and at 273 an inverse of current data is used as a seed for polarity equal to 1. Operations at 273 are for asserting and de-asserting polarity select signal 225 by FSM controller 220 for alternately providing seed 211 as an inverted and non-inverted QPRBS from received data 22 to PRBS generator 10.

From 273, at 274 it is determined whether expected data equals next data for an initial match. If expected data does not equal next data at 274, then an initial polarity was incorrect and polarity is again inverted at 272. If, however, expected data does equal next data at 274, then at 275 it is determined whether an error mask indicates an inversion in a QPRBS of received data 22. Expected data 235 may be bitwise XOR'd with next data 234 as indicated in error mask 229, so error mask 229 may be used by FSM controller 220 for a determination at 275.

FSM controller 220 may use an error mask 229 in a sequence of error mask outcomes at 275 to detect an inversion. If, at 275, a then current error mask 229 does not indicate an inversion, then as no inversion is detected at 275 another check is made back at 274 to verify a received data QPRBS and a checker generated QPRBS are still equivalent and synchronized with one another. If, at 275, a then current error mask 229 indicates an inversion in a QPRBS. Along those lines, combinatorial conditional compare circuit 250 may be used to detect an inversion at 275. One or more inversion patterns 252 may be used at 275. A number of logic 1's in a row may be user programmable for detection of a transition in a QPRBS from an inverted state to a non-inverted state, and vice versa. The number of logic 1's in a row may be for reliability of detection. For example, the likelihood of seven bit errors in a row is low, and so seven logic 1's in a row may be used to detect an inversion. Of course, the numbers of logic 1's in a row used in other implementations may be higher or lower than seven. Detection of a number of consecutive logic 1's, such as k for PRBS-k, during an inversion may be used to reduce probability of a false lock due to one or more bit errors.

If an inversion is detected at 275, then an initial match to a QPRBS of received data 22 is obtained. From an initial match, at 276 QPRBS generator 100 of QPRBS checker 200 is conditioned for a next sequence inverted with respect to a previous sequence. Along those lines, a number of logic 1's in an error mask 229 may be counted, such as by 1s counter 224. A number of logic 1's in an error mask 229 indicate how may bits belong to a next sequence, namely a following inverted QPRBS with respect to a current QPRBS. This number of logic 1's in an error mask 229 was previously described herein as a remainder.

At 276, in order to condition QPRBS generator 100 for the next QPRBS, such a number of logic 1's count from 1s counter 224 is loaded into mask generator 110 via set count signal 109 responsive to assertion of load count 223 by FSM controller 220. Moreover, at 276 in order to condition QPRBS generator 100 for such next QPRBS, polarity is inverted responsive to detection of an inversion. Along those lines, FSM controller 220 may assert invert polarity signal 222 to mask generator 110 of QPRBS generator 100 of QPRBS checker 200 to invert a polarity setting of mask generator 110 associated with the previous QPRBS.

From 276, at 277 it is again determined whether expected data equals next data for an initial lock. As previously described, position of a received pattern in an underlying QPRBS may not simply loop around, so an ability to quickly lock, namely lock within one full sequence cycle of an underlying QPRBS, to an incoming pattern even when received data 22 is obtained through a lossy channel is useful. This is more useful as a predetermined seed 211 need not be used for such locking. Along those lines, a communication channel using a QPRBS test pattern may be susceptible to a higher bit-error rate as is known, and so being able to lock to a QPRBS test pattern as described herein may be useful.

If expected data does not equal next data at 277, then polarity is again inverted at 272. If, however, expected data does equal next data at 277, such as by an error mask 229 of all logic 0's for example, then at 278 a number of correct outcomes, namely matches, at 277 may be counted. The number of correct outcomes may be user programmable. If a threshold number of correct outcomes is currently not reached at 278, then a lock is not yet detected and another check is made at 277. However, if a threshold number of correct outcomes is reached at 278 by iterative bitwise comparisons at 277 to generate corresponding error masks 229 without any errors, then a lock is detected at 278. In other words, a threshold number of matches in a row, namely a threshold number of error masks in a row without any errors, may be used to confirm that a QPRBS generated by QPRBS checker 200 is locked to a QPRBS of received data 22.

With a lock detected at 278, at 279 expected data may be compared for equality against next data. For each error detected, namely for each mismatch, a BER counter may be incremented. Along those lines, for each error detected as indicated by error signal 233, error counter 231 may be incremented to increase error count 205 for determination of a BER.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL")

devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 15:
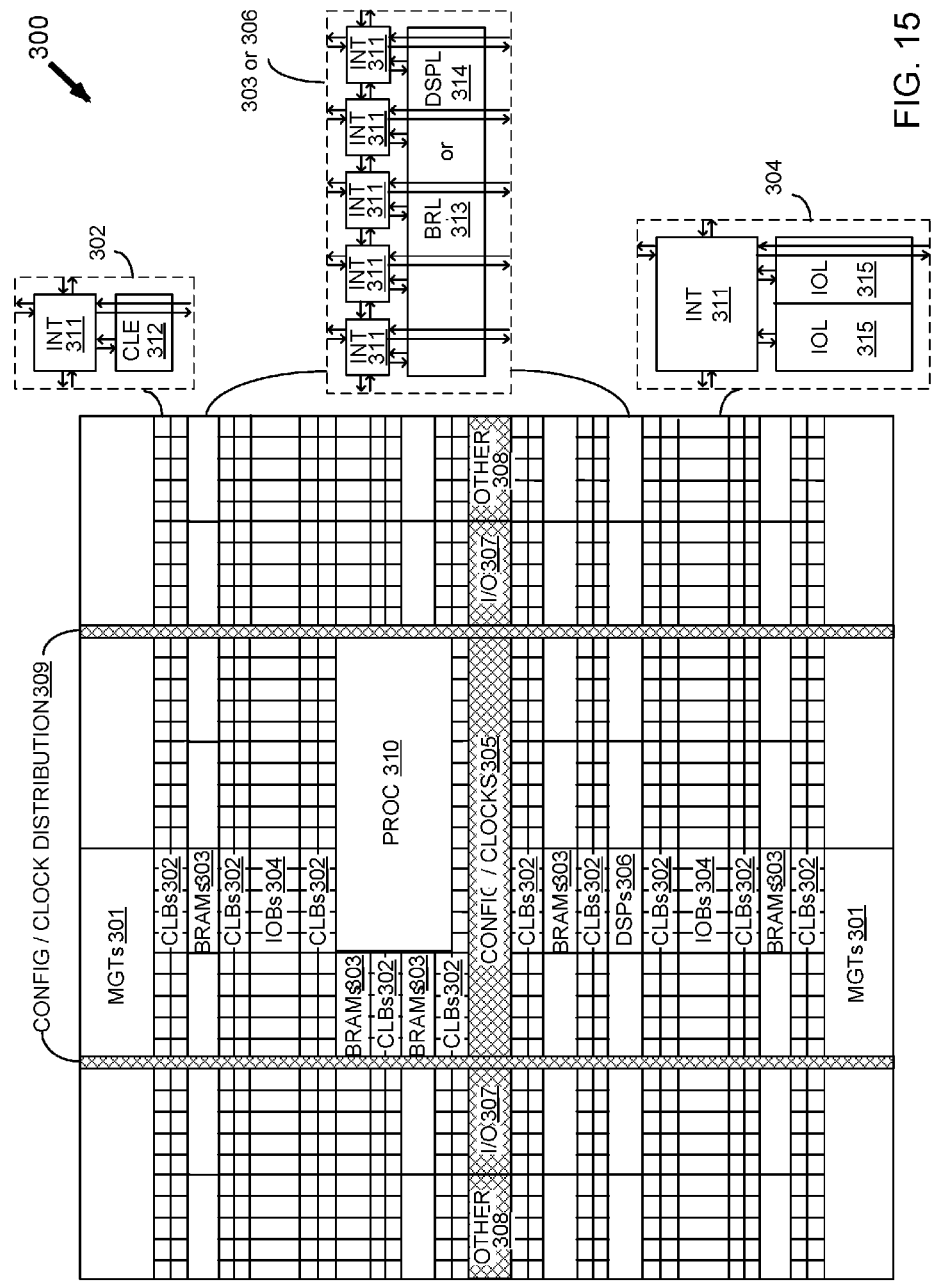
FIG. 15 is a simplified block diagram depicting an exemplary columnar Field Programmable Gate Array ("FPGA") architecture.

As noted above, advanced FPGAs can include several different types of programmable logic blocks in the array. For example, FIG. 15 illustrates an FPGA architecture 300 that includes a large number of different programmable tiles including multi-gigabit transceivers ("MGTs") 301, configurable logic blocks ("CLBs") 302, random access memory blocks ("BRAMs") 303, input/output blocks ("IOBs") 304, configuration and clocking logic ("CONFIG/CLOCKS") 305, digital signal processing blocks ("DSPs") 306, specialized input/output blocks ("I/O") 307 (e.g., configuration ports and clock ports), and other programmable logic 308 such as digital clock managers, analog-to-digital converters, system monitoring logic, and so forth. Some FPGAs also include dedicated processor blocks ("PROC") 310.

In some FPGAs, each programmable tile includes a programmable interconnect element ("INT") 311 having standardized connections to and from a corresponding interconnect element in each adjacent tile. Therefore, the programmable interconnect elements taken together implement the programmable interconnect structure for the illustrated FPGA. The programmable interconnect element 311 also includes the connections to and from the programmable logic element within the same tile, as shown by the examples included at the top of FIG. 15.

For example, a CLB 302 can include a configurable logic element ("CLE") 312 that can be programmed to implement user logic plus a single programmable interconnect element ("INT") 311. A BRAM 303 can include a BRAM logic element ("BRL") 313 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 306 can include a DSP logic element ("DSPL") 314 in addition to an appropriate number of programmable interconnect elements. An IOB 304 can include, for example, two instances of an input/output logic element ("IOL") 315 in addition to one instance of the programmable interconnect element 311. As will be clear to those of skill in the art, the actual I/O pads connected, for example, to the I/O logic element 315 typically are not confined to the area of the input/output logic element 315.

In the pictured embodiment, a horizontal area near the center of the die (shown in FIG. 15) is used for configuration, clock, and other control logic. Vertical columns 309 extending from this horizontal area or column are used to distribute the clocks and configuration signals across the breadth of the FPGA.

Some FPGAs utilizing the architecture illustrated in FIG. 15 include additional logic blocks that disrupt the regular columnar structure making up a large part of the FPGA. The additional logic blocks can be programmable blocks and/or dedicated logic. For example, processor block 310 spans several columns of CLBs and BRAMs.

Note that FIG. 15 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 15 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for generation of a quaternary pseudo random binary sequence ("QPRBS"), comprising:
a pseudo random binary sequence ("PRBS") generator configured to receive a seed of a PRBS to be generated;
a mask generator configured to receive a count value for the PRBS and generate a mask output corresponding to the PRBS based on the count value;
the PRBS generator and the mask generator both being configured for sequential operation with respect to one another; and
a masking circuit configured to receive the mask output and the PRBS to bitwise mask the PRBS with the mask output to generate the QPRBS.

2. The apparatus according to claim 1, wherein the mask generator comprises:
a first counter configured to receive the count value and to provide a feedforward count;
an adder to add the feedforward count to an integer width value of the mask output to increment the feedforward count to provide a feedback count;
the first counter configured to receive the feedback count to sequentially provide as the feedforward count;
a second counter configured to receive the feedback count to count modulus the integer width value to provide a remainder; and
a combinatorial circuit configured to receive the feedback count to determine whether an end of the PRBS is reached to assert a sequence reset.

3. The apparatus according to claim 2, wherein the combinatorial circuit comprises:
a comparator configured to receive the feedback count for comparison of a k-th bit position value in the feedback count with a logic value indicative of the feedback count being greater than $2^{\wedge}k-1$ for k an integer for a PRBS-k sized version of the PRBS; and the comparator configured to assert the sequence reset responsive to the k-th bit position in the feedback count being equal to the logic value.

4. The apparatus according to claim 2, wherein:
the first counter and the second counter are configured to receive the sequence reset to reset the first counter and the second counter; and
the first counter is configured to receive the remainder to increment the count value to provide the feedforward count anew after reset responsive to assertion of the sequence reset.

5. The apparatus according to claim 2, wherein the mask generator comprises:
a bit mask shifter configured to output a pre-mask output and to receive the remainder;
the bit mask shifter further configure to output either all logic zeroes or all logic ones during a non-transition state and to shift in a number of either logic zeros or logic ones responsive to the remainder indicating an overlap between adjacent pseudo random binary sequences output from the PRBS generator within the integer width value to provide the pre-mask output during a transition state; and
a polarity inverter configured to receive the sequence reset to invert a current polarity of the pre-mask output to provide the mask output.

6. The apparatus according to claim 5, wherein:
the combinatorial circuit is a first combinatorial circuit;
the masking circuit is a second combinatorial circuit; and
the second combinatorial circuit is configured to receive the mask output from the polarity inverter and to receive the PRBS from the PRBS generator to bitwise mask at least one symbol at a time of the PRBS to generate the QPRBS.

7. The apparatus according to claim 6, wherein the combinatorial circuit comprises a plurality of exclusive-OR ("XOR") gates configured for bitwise exclusive disjunction of each bit of the at least one symbol with a corresponding bit of the mask output from the polarity inverter.

8. An apparatus for checking a quaternary pseudo random binary sequence ("QPRBS"), comprising:
a QPRBS generator comprising:
a pseudo random binary sequence ("PRBS") generator configured to receive a seed for a PRBS to be generated;
a mask generator configured to receive a count value for the PRBS to generate a mask output;
the PRBS generator and the mask generator both configured for sequential operation with respect to one another; and
a first masking circuit configured to receive the mask output and the PRBS to bitwise mask the PRBS with the mask output to generate the QPRBS;
a select circuit configured to receive data to selectively invert or not invert the data received to output as the seed;
a controller configured to control operation of the QPRBS generator responsive to an error mask and to select the seed output from the select circuit; and
a second masking circuit configured to receive the data and the QPRBS to bitwise mask the received data with the QPRBS to generate the error mask.

9. The apparatus according to claim 8, wherein the second masking circuit is an error masking circuit configured to bitwise mask at least one symbol at a time of each of the QPRBS and the data to generate the error mask.

10. The apparatus according to claim 9, wherein the controller is a finite state machine configured to check for an inversion in the received data responsive to the error mask.

11. The apparatus according to claim 10, wherein the finite state machine is configured to:
determine a number of logic ones in a remainder to provide a ones count;
load the ones count into a sequence position counter of the mask generator as a set count; and
invert polarity of the mask generator.

12. A method for generation of a quaternary pseudo random binary sequence ("QPRBS"), comprising:
obtaining by a pseudo random binary sequence ("PRBS") generator a seed of a PRBS to be generated;
receiving a count value corresponding to the PRBS by a mask generator;
generating the PRBS with the PRBS generator;
generating a mask output for the PRBS based on the count value with the mask generator;
the PRBS generator and the mask generator being sequentially operated together for the generating of the PRBS and the mask output; and
bitwise masking with a masking circuit the PRBS with the mask output to generate the QPRBS.

13. The method according to claim 12, wherein the generating of the mask output comprises:
obtaining by a counter the count value;
generating with the counter a feedforward count;
incrementing with an adder the feedforward count by a width value;
determining whether the feedforward count incremented indicates an end of the PRBS; and
for the end of the PRBS not being determined, receiving the feedforward count incremented as a feedback count by the counter for another iteration of the incrementing.

14. The method according to claim 13, wherein the generating of the mask output comprises:
for the end of the PRBS being determined,
setting a remainder to the incremented count modulus of the width value; and
inverting a polarity associated with the PRBS.

15. The method according to claim 14, wherein the generating of the mask output comprises:
bit shifting a bit mask responsive to the remainder; and
applying the inverted polarity to the bit mask bit-shifted for providing the mask output.

16. The method according to claim 12, wherein the QPRBS is a receiver-generated QPRBS, the method further comprising checking a receiver-received QPRBS against the receiver-generated QPRBS.

17. The method according to claim 16, wherein the checking comprises:
selectively inverting the receiver-received QPRBS for input to the PRBS generator as the seed of the receiver-generated QPRBS to be generated;
using the receiver-received QPRBS without inversion for a first polarity; and
using the receiver-received QPRBS with inversion for a second polarity opposite the first polarity.

18. The method according to claim 17, wherein the checking comprises:
bitwise comparing a first portion of the receiver-received QPRBS against a second portion of the receiver-generated QPRBS to provide an error mask; and for the first portion of the receiver-received QPRBS matching the second portion of the receiver-generated QPRBS, detecting an inversion in the receiver-received QPRBS.

19. The method according to claim 18, further comprising conditioning the PRBS generator and the mask generator responsive to the detecting of the inversion, wherein the conditioning comprises:

determining a remainder responsive to the error mask;

loading the remainder into the mask generator as the count value; and inverting polarity in the mask generator to invert the mask output.

20. The method according to claim 19, further comprising:

iteratively bitwise comparing first portions of the receiver-received QPRBS against second portions of the receiver-generated QPRBS to provide corresponding error masks; and obtaining a lock for a threshold number of error masks in a row without any errors.

* * * * *